US009167484B2

(12) United States Patent
Joul

(10) Patent No.: US 9,167,484 B2
(45) Date of Patent: Oct. 20, 2015

(54) TRANSITION FROM PACKET-SWITCHED TO CIRCUIT-SWITCHED CONNECTION BASED ON COMMUNICATION QUALITY

(71) Applicant: T-Mobile USA, Inc, Bellevue, WA (US)

(72) Inventor: Christopher H. Joul, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 77 days.

(21) Appl. No.: 13/663,777

(22) Filed: Oct. 30, 2012

(65) Prior Publication Data
US 2014/0119209 A1 May 1, 2014

(51) Int. Cl.
*H04W 4/00* (2009.01)
*H04W 36/00* (2009.01)

(52) U.S. Cl.
CPC ................................ *H04W 36/0022* (2013.01)

(58) Field of Classification Search
None
See application file for complete search history.

(56) References Cited

U.S. PATENT DOCUMENTS

| 2006/0062208 | A1* | 3/2006 | Li et al. ........................ 370/352 |
| 2010/0281171 | A1* | 11/2010 | Khasnabish .................. 709/227 |
| 2010/0309847 | A1* | 12/2010 | Bharadwaj .................... 370/328 |
| 2012/0230253 | A1* | 9/2012 | Liu ............................... 370/328 |
| 2012/0281579 | A1* | 11/2012 | Noldus ......................... 370/252 |
| 2013/0070757 | A1* | 3/2013 | Elliott et al. .................. 370/352 |
| 2013/0242775 | A1* | 9/2013 | Taylor ........................... 370/252 |
| 2013/0324145 | A1* | 12/2013 | Tabet et al. ................ 455/452.2 |
| 2014/0064137 | A1* | 3/2014 | El-Hennawey et al. ...... 370/253 |
| 2014/0153429 | A1* | 6/2014 | Hardy et al. .................. 370/252 |

* cited by examiner

*Primary Examiner* — Anh-Vu Ly
(74) *Attorney, Agent, or Firm* — Lee & Hayes, PLLC

(57) ABSTRACT

Techniques for transitioning a synchronous communication engaged in by a telecommunication device from a packet-switched connection to a circuit-switched connection are described herein. The techniques include either or both of the telecommunication device or the telecommunication network determining a quality metric for a synchronous communication based at least in part on monitoring of the synchronous communication, the synchronous communication being transmitted using a packet-switched connection associated with the telecommunication network. Based at least in part on the quality metric, the telecommunication network and telecommunication device switch the synchronous communication from the packet-switched connection to a circuit-switched connection associated with the telecommunication network.

23 Claims, 5 Drawing Sheets

TRANSITION FROM PACKET-SWITCHED TO CIRCUIT-SWITCHED CONNECTION BASED ON COMMUNICATION QUALITY

BACKGROUND

Use of packet-switched connections for transmitting synchronous communications, such as voice calls, and data across telecommunication networks is increasing. Such packet-switched connections allow for greater speed and throughput, while making packet-switched data from other networks, such as the Internet, more readily available. Most telecommunication networks, however, still utilize access networks that provide circuit-switched connections, such as Global System for Mobile Communications (GSM) networks or Universal Mobile Telecommunications System (UMTS) networks, due to the substantial infrastructure investment needed to expand packet-switched access networks. Such circuit-switched access networks may provide comparable or, at times, better speed and quality than packet-switched access networks for some types of data, including synchronous communications.

Packet-switched access networks, due to their sparsity and data-transmission capabilities, are often congested, providing slow data services and poor quality synchronous communications. These packet-switched access networks are often in proximity to a circuit-switched access network or, as with Evolved High-Speed Packet Access (HSPA+) access networks, include the capability of using both packet-switched and circuit-switched connections. Because devices are configured to use the packet-switched access networks when they are available, however, these circuit-switched access networks are often underutilized.

One technique for switching from a packet-switched connection to a circuit-switched connection involves the use of a platform-level technology called single radio voice call continuity (SR-VCC). SR-VCC determines when a packet-switched access network is associated with a diminished signal and requests that the telecommunication network transition a voice call from a packet-switched connection to a circuit-switched connection. SR-VCC is only able to account for diminished signals, however, and not for poor quality of the voice calls themselves. Also, SR-VCC implements detection of diminished signals entirely on telecommunication devices; the telecommunication network does not participate in such detection.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, techniques for transitioning a synchronous communication engaged in by a telecommunication device from a packet-switched connection to a circuit-switched connection. The techniques include either or both of the telecommunication device or the telecommunication network determining a quality metric for a synchronous communication based at least in part on monitoring of the synchronous communication, the synchronous communication being transmitted using a packet-switched connection associated with the telecommunication network. Based at least in part on the quality metric, the telecommunication network and telecommunication device switch the synchronous communication from the packet-switched connection to a circuit-switched connection associated with the telecommunication network.

Figure 1C:
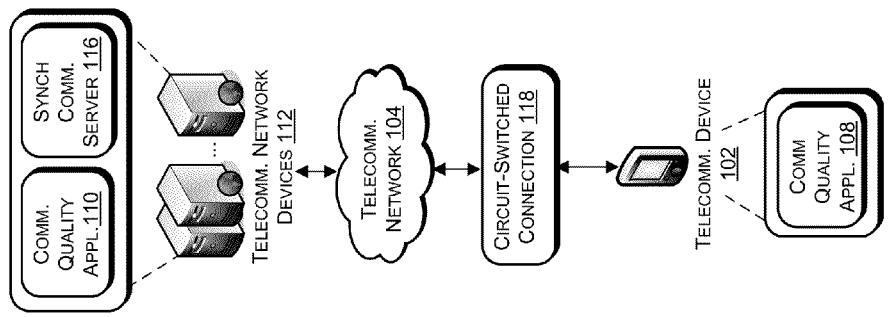
FIGS. 1a-1c illustrate an overview of techniques for transitioning a synchronous communication from a packet-switched connection to a circuit-switched connection based on the quality of the synchronous communication.
Figure 1B:
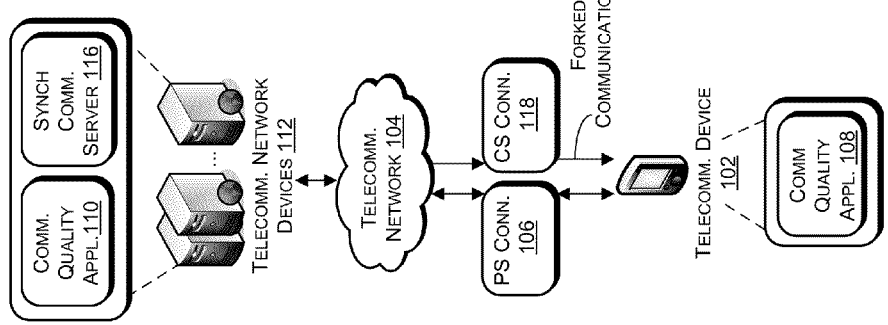
Figure 1A:
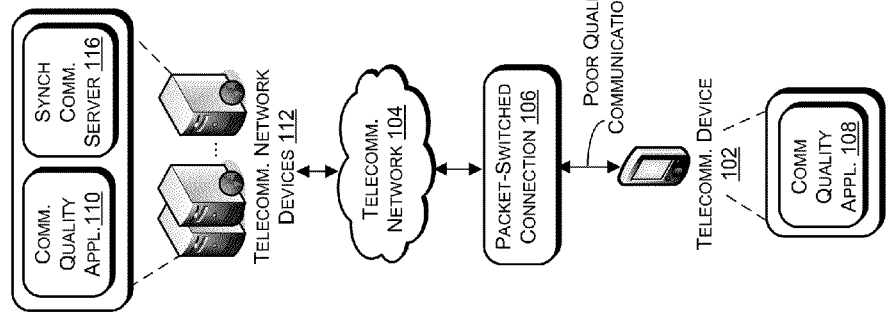
Figure 3:
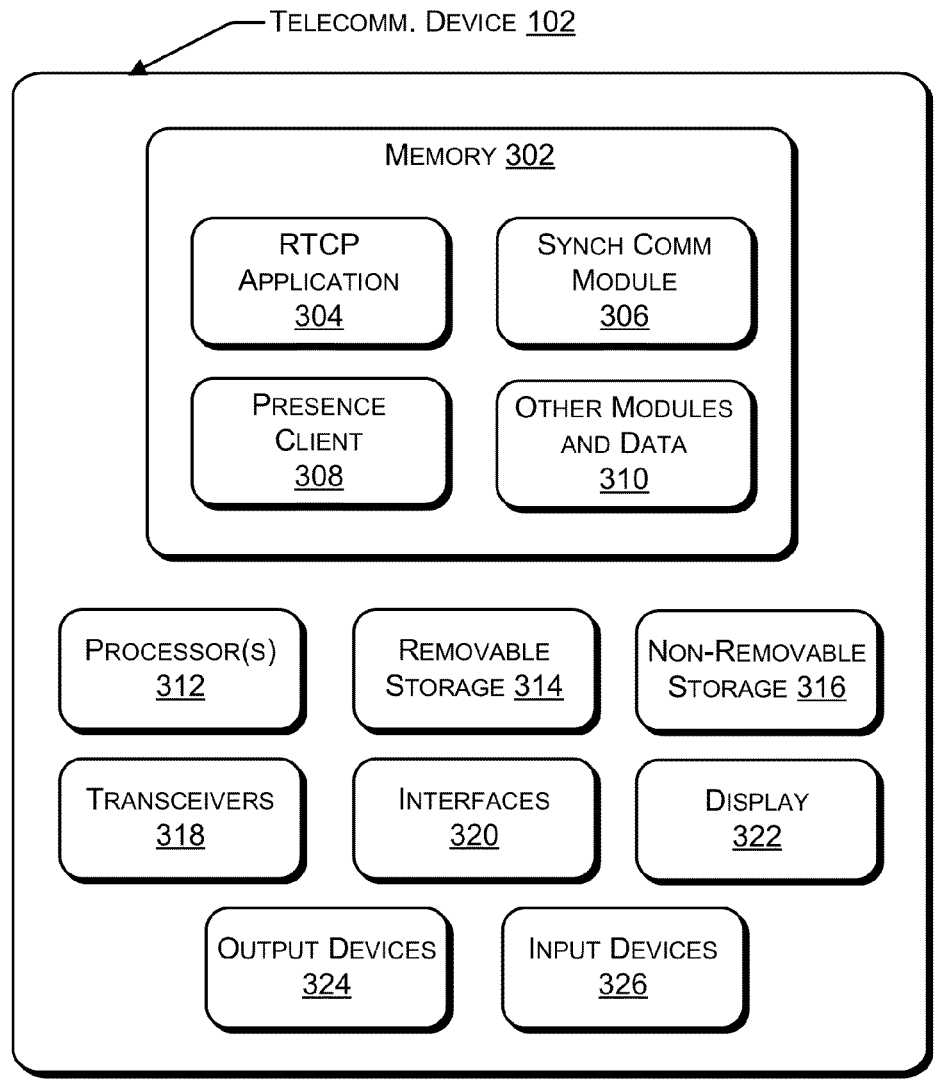
FIG. 3 illustrates a component level view of a telecommunication device capable of determining the quality of a synchronous communication that the telecommunication device is engaged in and participating in switching from a packet-switched connection to a circuit-switched connection based on that determined quality.

FIGS. 1a-1c an overview of these techniques for transitioning a synchronous communication from a packet-switched connection to a circuit-switched connection. As shown in FIG. 1a, a telecommunication device 102 may engage in a synchronous communication, such as a voice call, a video chat, a video conference, or an instant messaging session with one or more other devices. The telecommunication device 102 may be any sort device capable of cellular or wireless network communication, such as a cellular phone, a tablet computer, a personal digital assistant (PDA), a personal computer (PC), a laptop computer, a media center, a work station, etc. An example telecommunication device 102 is illustrated in FIG. 3 and described below with reference to that figure.

The telecommunication device 102 may be connected to a telecommunication network 104, such as a telecommunication network of a telecommunication service provider that provides a plan or services to the telecommunication device 102 or a telecommunication network of another telecommunication service provider. The telecommunication network 104 may include a core network and a plurality of access networks that are associated with base stations, nodeBs, eNodeBs, or other access points. The access networks of the telecommunication network 104 may each be associated with a specific geographic area (e.g., a cell, a macrocell, a microcell, a femtocell, etc.). In some embodiments, a geographic location may be associated with multiple access networks (e.g., a Long Term Evolution (LTE) network and a 3G/UMTS network). Some access networks may provide packet-switched connections for synchronous communications, such as Voice over Internet Protocol (VoIP) calls. Others may provide circuit-switched connections for the synchronous communications. Others, such as HSPA+, may include bearer service(s) for both packet-switched and circuit-switched connections. These access networks communicate with the core network of the telecommunication network 104, which may manage users, devices, and the synchronous communications.

In various embodiments, as illustrated in FIG. 1a, the telecommunication device 102 may initiate a synchronous communication, such as a VoIP call. The telecommunication device 102 may engage in the synchronous communication over a packet-switched connection 106 provided by the telecommunication network 104. The packet-switched connection 106 may be provided by a packet-switched radio bearer of an LTE access network, HSPA+ network, or other access network of the telecommunication network 104. The packet-switched connection 106 could also be provided by an access point of an unlicensed wireless Internet Protocol (IP) network, such as a Wi-Fi network.

In various embodiments, the telecommunication device 102 may monitor the quality of the synchronous communication carried by the packet-switched connection 106. To perform the monitoring, the telecommunication device 102 may be configured with a communication quality application 108. The communication quality application 108 may utilize any one or more techniques to monitor the quality of the synchronous communication, such as examining packet loss, packet arrival delays, packets arriving out of order, etc. In some embodiments, the communication quality application 108 may be a Real-time Transport Control Protocol (RTCP) application that determines control information associated with the synchronous communication.

In further embodiments, the communication quality application 108 may monitor the quality of the synchronous communication as received on the downlink channel, and a communication quality application 110 of the telecommunication network 104 may monitor the quality of the synchronous communication on the uplink channel. Like communication quality application 108, the communication quality application 110 may also be an RTCP application and may determine control information associated with the synchronous communication, such as packet loss, etc.

The communication quality application 110 may be implemented on one or more telecommunication network devices 112. Such devices 112 may each be or include a server or server farm, multiple, distributed server farms, a mainframe, a work station, a personal computer (PC), a laptop computer, a tablet computer, an embedded system, or any other sort of device or devices. In one implementation, one or more of the telecommunication network devices 112 represent a plurality of computing devices working in communication, such as a cloud computing network of nodes. Also, the telecommunication network devices 112 may each be or include devices of a core network of the telecommunication network 104, such as the core network illustrated in FIG. 2 and described below. Such telecommunication network devices 112 will be described further with reference to that figure.

Continuing with FIG. 1a, one or both of the communication quality application 108 or the communication quality application 110 may determine that the synchronous communication engaged in by the telecommunication device 102 exhibits poor quality 114. Such poor quality may be indicative of packet loss, packet discard, network delay, end system delay, or signal level.

Upon determining that the synchronous communication exhibits poor quality, the one or both of the communication quality application 108 or the communication quality application 110 may report a metric associated with the poor quality to a component of the telecommunication network 104 responsible for tracking and disseminating quality metrics. For example, the communication quality application 108 may include or be associated with a presence client that receives a report from an RTCP application of the telecommunication device 102 and determines a quality metric based on that report. The report may include a number value, and the communication quality application may map that number value to a textual label (e.g., "bad VoIP"). Each number value may be associated with a specific text label, or a single text label may be associated with a range of number values. The text label may then be used as the quality metric. Such a metric may indicate that there is no synchronous communication over a packet-switched connection 106, that the synchronous communication over the packet-switched connection 106 exhibits poor quality, or that the synchronous communication over the packet-switched connection 106 exhibits good quality. For instance, the quality metric could be "no VoIP," "bad VoIP," or "good VoIP." The presence client may form a presence update message including that quality metric and provide the presence update message to a presence server of the telecommunication network 104. The communication quality application 110 may also include a presence client, which may form a presence update message including a quality metric and provide it to the presence server.

The presence server or some other component of the telecommunication network 104 responsible for tracking and disseminating quality metrics may then publish the quality metric as a presence update to any device subscribing to presence updates for the telecommunication device 102. In some embodiments, a synchronous communication server 116 of implemented by the telecommunication network devices 112 may be among the subscribers. When the presence server receives quality metrics from both the communication quality application 108 and the communication quality application 110, the presence server may select the quality metric associated with the poorest perceived quality or may construct and publish some synthesis of the quality metrics.

In other embodiments, rather than reporting the quality metric in a presence update message, the communication quality application 108 or the communication quality application 110 may request that the synchronous communication server 116 transition the synchronous communication to a circuit-switched connection when the quality metric fails to meet a threshold or diverges from a pattern. In some embodiments, the communication quality application 108 or the communication quality application 110 may perform the requesting conditionally, based on whether the telecommunication device 102 detects or is otherwise determined to be in the presence of an access network with a circuit-switched bearer service.

In such manners, the synchronous communication server 116 may be passively informed of the need to transition the synchronous communication to a circuit-switched connection by a presence update or may be actively requested to make the transition. Both the passive informing and the active requesting are responsive to a determination that the synchronous communication exhibits poor quality.

FIG. 1b illustrates the synchronous communication server 116 transitioning a synchronous communication from a packet-switched connection 106 to a circuit-switched connection 118 by forking 120 the synchronous communication over a circuit-switched connection 118. In various embodiments, the synchronous communication server 116 may be implemented on a telephony application server (TAS), a mobile switching center (MSC), or on another component of the telecommunication network 104 responsible for handling voice calls, video chat, or other synchronous communications.

Upon receiving a presence update indicating a bad quality synchronous communication, or in response to receiving a request to transition a synchronous communication, the synchronous communication server 116 may fork the synchronous communication, maintaining the synchronous communication over the packet-switched connection 106 in a first leg and initiating a second leg over a circuit-switched connection 118 as a call or chat request directed to the telecommunication device 102. The call or chat request may request a circuit-switched connection 118 from a circuit-switched bearer service of an access network and may be directed to a specific number or identifier that causes the telecommunication device 102 to automatically answer the call or chat request. Once the telecommunication device 102 has answered the call or chat request, the telecommunication device 102 may be connected to the telecommunication network 104 via both the packet-switched connection 106 and the circuit-switched connection 118. The telecommunication device 102 may then use the circuit-switched connection 118 to carry on the synchronous communication.

FIG. 1c illustrates the completion of the transition of the synchronous communication from the synchronous communication to the circuit-switched connection 118. In various embodiments, the packet-switched connection 106 may be terminated in any of a number of ways. For example, the telecommunication device 102 or the synchronous communication server 116 may automatically terminate the packet-switched connection 106 after passage of a specified amount of time from forking the synchronous communication or from answering the forked call or chat request. In some embodiments, after transitioning the synchronous communication to the circuit-switched connection 118, the communication quality application 108 may determine that there is no synchronous communication over a packet-switched connection 106, may include a quality metric such as "no VoIP" in a presence update message, and may provide that presence update message to the telecommunication network 104. In response to receiving such a quality metric, the telecommunication network 104 may deallocate network resources utilized by the packet-switched connection 106, effectively terminating the packet-switched connection 106.

Example Telecommunication Network

Figure 2:
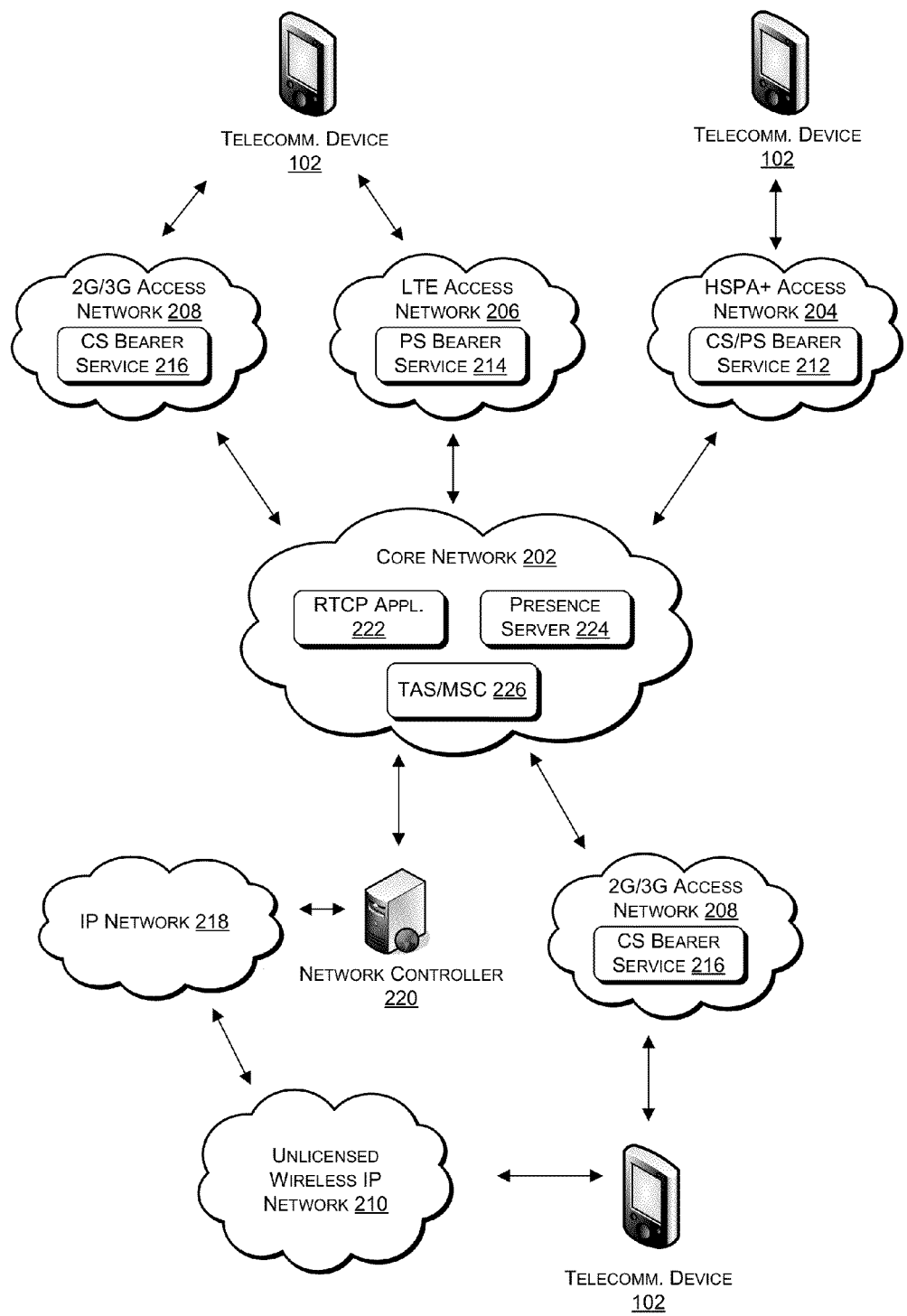
FIG. 2 illustrates an example telecommunication network connected to telecommunication devices through packet-switched bearers, circuit-switched bearers, or other packet-based connections of any of a number of access networks.

FIG. 2 illustrates an example telecommunication network 104 connected to telecommunication devices 102 through packet-switched bearers, circuit-switched bearers, or other packet-based connections of any of a number of access networks. As illustrated in FIG. 2, the telecommunication network 104 may comprise a core network 202 that is accessed by the telecommunication devices 102 through any one or more of access networks 204-210, the one or more access networks 2104-210 including an HSPA+ access network 204, an LTE access network 206, a 2G/3G access network 208, and an unlicensed wireless IP network 210. The core network 202 may include nodes supportive of legacy access networks and packet-based access networks. Such nodes may include any or all of a home location register (HLR), a visitor location register (VLR), a serving general packet radio service (GPRS) support node (SGSN), a gateway GPRS support node (GGSN), a policy control rules function (PCRF) node, a mobility management entity (MME), a serving gateway, a session border controller (SBC), a media gateway, a mobile switching center (MSC), as well as IP multimedia subsystem (IMS) components, such as a presence server, a telephony application server (TAS), and one or more call session control functions (CSCF). The core network 202 may be a GPRS core network, an evolved packet core (EPC) network, or may include elements from both types of core networks. The core network 202 may provide a variety of services to telecommunication devices 102 connected to access networks of its telecommunication network 104, such as synchronous communication routing across a public switched telephone network (PSTN). Further services may include call control, switching, authentication, billing, etc.

In various embodiments, the access networks 204-210 may each be associated with a geographic location of a different scope, such as a macrocell, a cell, a microcell, a femtocell, or a location with a WiFi, WiMax, Bluetooth, or near field communication (NFC) signal. One of these networks may be an HSPA+ access network 204. The HSPA+ access network 204 may be a universal terrestrial radio network (UTRAN) or a GSM EDGE radio access network (GERAN) and may include a base station, such as a Node B, as well as a radio network controller (RNC). The HSPA+ access network 204 may provide both circuit-switched and packet-switched connection over a same signal spectrum and may use a wideband code division multiple access (W-CDMA) air interface. The Node B of the HSPA+ access network 204 may include multiple antennas to allow the HSPA+ access network 204 to deliver high speed communications.

In various embodiments, as shown in FIG. 2, the HSPA+ access network 204 may include a packet-switched/circuit-switched bearer service 212. The packet-switched/circuit-switched bearer service 212 may implement a packet-switched radio bearer for a packet-switched connection or a circuit-switched radio bearer for a circuit-switched connection and may do so responsive to a request for service. The request may specify packet-switched or circuit-switched service, or may rely on default settings of the packet-switched/circuit-switched bearer service 212. While the packet-switched/circuit-switched bearer service 212 is shown as one bearer service, the packet-switched/circuit-switched bearer service 212 may be implemented as a separate packet-switched bearer service and circuit-switched bearer service.

In some embodiments, the access networks of the telecommunication network 104 may also include an LTE access network 206. The LTE access network 206 is also referred to as an evolved UTRAN (E-UTRAN) and may include an evolved Node B (eNode B) that communicates directly with an MME or serving gateway of the core network 202. The LTE access network 206 provides packet-switched connections over a given signal spectrum, may use an orthogonal frequency-divisional multiple access (OFDMA) air interface for downlink communication and may use a single-carrier frequency-divisional multiple access (SC-FDMA) air interface for uplink communication.

In various embodiments, as shown in FIG. 2, the LTE access network 206 may include a packet-switched bearer service 214. The packet-switched bearer service 214 may implement a packet-switched radio bearer for a packet-switched connection and may do so responsive to a request for service. The request may specify packet-switched or may rely on default settings of the packet-switched bearer service 214.

In further embodiments, the 2G/3G access network 208 may be any sort of access network, such as a GSM or UMTS network. The 2G/3G access network 208 may also be referred to as a UTRAN or GERAN and may include a base station or Node B, as well as an RNC. The 2G/3G access network 208 may provide circuit-switched connections over a given signal spectrum and may use any sort of air interface, such as a code division multiple access (CDMA), time division multiple access (TDMA), or frequency division multiple access (FDMA) air interface. In some embodiments, the 2G/3G access network 208 may have a same or overlapping cell with an LTE access network 206, as is shown in FIG. 2. In one embodiment, equipment for both the 2G/3G access network 208 and the LTE access network 206 may be placed on a same cellular tower. In other embodiments, the 2G/3G access network 208 and LTE access network 206 may utilize separate towers and/or have separate cells.

In various embodiments, as shown in FIG. 2, the 2G/3G access network 208 may include a circuit-switched bearer service 216. The circuit-switched bearer service 216 may implement a circuit-switched radio bearer for a circuit-switched connection and may do so responsive to a request for service. The request may specify circuit-switched service or may rely on default settings of the circuit-switched bearer service 216.

In various embodiments, the access networks 204-210 may further include an unlicensed wireless IP network 210, such as a WiFi, WiMax, Bluetooth, or NFC network. Such an unlicensed wireless IP network 210 may not be a part of the telecommunication network 104, but may be connected to it by an IP network 218, such as the Internet, and a network controller 220, the network controller 220 being a node of the telecommunication network 104. Thus, the unlicensed wireless IP network 210 is still able to serve as an access network of the telecommunication network 104. The unlicensed wireless IP network 210 may transmit data over an unlicensed signal spectrum and may utilize the transmission control protocol/Internet protocol (TCP/IP) for packet data transmissions. Connections supported by the unlicensed wireless IP network 210 are packet-based connections (also referred to herein as packet-switched connections). Each unlicensed wireless IP network 210 may include one or more access point devices, such as wireless routers, that may have a range. That range of the access point devices may overlap with an area of another access network 204-208, such as 2G/3G access network 208.

In various embodiments, a telecommunication device 102 may be in range of any one or more access networks 204-210 at a given point in time. For example, as shown in FIG. 2, one telecommunication device 102 may be in range of an HSPA+ access network 204, another may be in range of an LTE access network 206 and a 2G/3G access network 208, and yet another may be in range of a 2G/3G access network 208 and an unlicensed wireless IP network 210. These telecommunication devices 102 may engage in synchronous communications with each other and with other devices.

As is further illustrated in FIG. 2, the core network 202 may include an RTCP application 222, a presence server 224, and a TAS/MSC 226. The RTCP application 222 may be the communication quality application 110 shown in FIG. 1 and described above. Such a RTCP application 222 may be implemented on an SBC, on a media gateway, or on another device. In addition to monitoring RTCP uplink traffic and generating RTCP reports, the RTCP application 222 may include or be associated with a presence client of the communication quality application 110 that generates presence update messages which include quality metrics, the quality metrics being determined based on the RTCP reports.

The presence server 224 may be the presence server described above with reference to FIG. 1 and may be configured to receive and publish presence updates.

The TAS/MSC 226 may be the synchronous communication server 116 shown in FIG. 1 and described above. Such a TAS/MSC 226 may receive presence updates or transition requests and may, in response, fork a synchronous communication and transition that synchronous communication from a packet-switched connection to a circuit-switched connection. In various embodiments, the TAS/MSC 226 may receive multiple presence updates or transition requests during a time period. To avoid congestion/reduced quality of service for at least some of the telecommunication devices 102, the TAS/MSC 226 may prioritize the forking/transition actions for the telecommunication devices 102 based on the codecs that the telecommunication devices 102 are using for their synchronous communications.

Example Telecommunication Device

FIG. 3 illustrates a component level view of a telecommunication device capable of determine the quality of a synchronous communication that the telecommunication device is engaged in and to participate in switching from a packet-switched connection to a circuit-switched connection based on that determined quality. As illustrated, the telecommunication device 102 comprises a system memory 302 storing an RTCP application 304, a presence client 306, synchronous communication module 308, and other modules and data 310. Also, the telecommunication device 102 includes processor(s) 312, a removable storage 314, a non-removable storage 316, transceivers 318, interfaces 320, a display 322, output device(s) 324, and input device(s) 326.

In various embodiments, system memory 302 is volatile (such as RAM), non-volatile (such as ROM, flash memory, etc.) or some combination of the two. The RTCP application 304 stored in the system memory 302 may be configured to monitor RTCP traffic associated with synchronous communications, such as voice calls, over packet-switched connections. For example, the RTCP application 304 may monitor a downlink channel of a packet-switched connection used for a synchronous communication and determine one or more indications of quality associated with the synchronous communication, such as packet loss, delayed or out-of-order packet arrival, etc.

In some embodiments, a presence client 306 may retrieve or receive the indications of quality from the RTCP application 304 and may determine a quality metric associated with the synchronous communication based on the indications. For example, the presence client 306 may determine that the indications are associated with one of three metrics: good packet communications, bad packet communications, or no packet communications. The last of these quality metrics, no packet communications, may indicate that the packet-switched connection for transmitting the synchronous communication is inactive or has been terminated. The other metrics, good packet communications and bad packet communications may be determined through use of a threshold or pattern that is compared to the indicators of quality. The presence client 306 may then communicate the quality metric in a presence update message to a presence server 214 of the telecommunication core network 202.

In various embodiments, the synchronous communication module 308 may be responsible for initiating, maintaining and terminating synchronous communications, such as voice calls, on behalf of the telecommunication device 102 over the telecommunication network 104. Such a synchronous communication module 308 may include, for example, a call handler application, a video chat client, or platform-level component for handling synchronous communications. The synchronous communication module 308 may be configured to utilize a packet-switched connection when available, or to utilize a packet-switched connection in some circumstances and a circuit-switched connection in other circumstances. For example, the synchronous communication module 308 may maintain and use a prioritized ranking of access networks and may choose an access network based on that ranking. The ranking could, for instance, prioritize Wi-Fi over LTE, prioritize LTE over HSPA+, and prioritize HSPA+ over 2G/3G networks. Because these some of these prioritized access networks may be geographically scarce and occasionally over-utilized, placing and receiving synchronous communications over, e.g., Wi-Fi, LTE, or HSPA+ may result, on occasion, in poor quality synchronous communication.

As mentioned, such poor quality synchronous communications over packet-switched connections may be detected by the RTCP application 304 and presence client 306, which may inform the telecommunication network 104 of the poor quality synchronous communication. In response, the synchronous communication module 308 may receive a forked leg of the synchronous communication over a circuit-switched connection. In some embodiments, the synchronous communication module 308 may only receive such a forked leg of a synchronous communication when the telecommunication device is in proximity to an HSPA+ or 2G/3G access network. The synchronous communication module 308 may receive the forked leg as, for example, a call or video chat request directed to a specific phone number, network address, IMS number, or other identifier that, when received by the synchronous communication module 308, is automatically accepted/answered. The synchronous communication module 308 may then switch the synchronous communication to the received, forked leg, resulting in a discontinuance of traffic over the packet-switched connection used for the synchronous communication. After some time, the synchronous communication module 308 may drop or discontinue use of that packet-switched connection. In such a manner, the synchronous communication module 308 may initiate a synchronous communication over a packet-switched connection and switch the synchronous communication to a circuit-switched connection.

The other modules or data 310 stored in the system memory 302 may comprise any sort of applications or platform components of the telecommunication device 102, as well as data associated with such applications or platform components. For instance, the other modules or data 310 may include an operating system of the telecommunication device 102.

The other modules or data 310 may also, in some embodiments, include one or more components for determining, based on the RTCP application 304 or based on other factors from other applications and components, quality metric(s) associated with a synchronous communication. If the quality metric(s) are indicative of a poor quality connection, the other modules or data 310 may request that the telecommunication network fork the synchronous communication over a circuit-switched connection. Such other modules or data 310 may be an alternative or a complement to the presence client 306.

In some embodiments, the processor(s) 312 is a central processing unit (CPU), a graphics processing unit (GPU), or both CPU and GPU, or any other sort of processing unit.

Telecommunication device 102 also includes additional data storage devices (removable and/or non-removable) such as, for example, magnetic disks, optical disks, or tape. Such additional storage is illustrated in FIG. 3 by removable storage 314 and non-removable storage 316. Tangible computer-readable media may include volatile and nonvolatile, removable and non-removable media implemented in any method or technology for storage of information, such as computer readable instructions, data structures, program modules, or other data. System memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the telecommunication device 102. Any such tangible computer-readable media may be part of the telecommunication device 102.

In some embodiments, the transceivers 318 include any sort of transceivers known in the art. For example, transceivers 318 may include a radio transceiver that performs, in conjunction with an interface 320, the function of transmitting and receiving radio frequency communications via an antenna. The radio interface may facilitate wireless connectivity between the telecommunication device 102 and various cell towers, base stations and/or access points of the telecommunication network 104. The transceivers 318 may also include a wireless communication transceiver and a near field antenna for communicating over unlicensed wireless IP networks 210, such as local wireless data networks and personal area networks (e.g., Bluetooth or near field communication (NFC) networks).

In various embodiments, the interfaces 320 are any sort of interfaces. Interfaces 320 include any one or more of a wireless LAN interface, or a near field interface. The a wireless LAN interface can include a Wi-Fi interface or a Wi-Max interface, or a Bluetooth® interface that performs the function of transmitting and receiving wireless communications using, for example, the IEEE 802.11, 802.16 and/or 802.20 standards. Such an interface 320 may comprise logic or a device driver associated with a wireless communication transceiver 320 such as a Wi-Fi radio or a Wi-Max radio and may provide a method that enables the wireless communication transceiver 320 to be enabled or disabled. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 322 is a liquid crystal display or any other type of display commonly used in telecommunication devices. For example, display 322 may be a touch-sensitive display screen, and can then also act as an input device or keypad, such as for providing a soft-key keyboard, navigation buttons, or the like.

In some embodiments, the output devices 324 include any sort of output devices known in the art, such as a display (already described as display 322), speakers, a vibrating mechanism, or a tactile feedback mechanism. Output devices 324 also include ports for one or more peripheral devices, such as headphones, peripheral speakers, or a peripheral display.

In various embodiments, input devices 326 include any sort of input devices known in the art. For example, input devices 326 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 4:
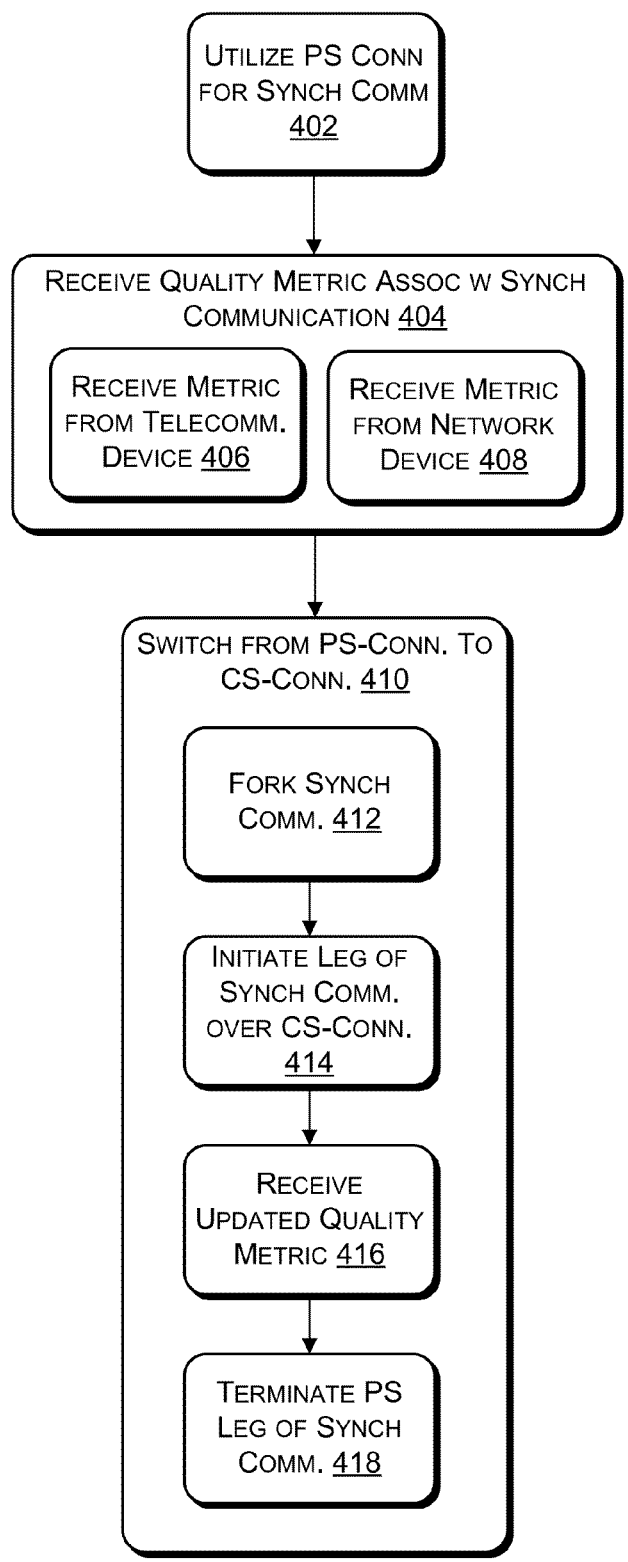
FIG. 4 illustrates an example process performed by devices of a telecommunication network for receiving or determining a quality of a synchronous communication that a telecommunication device is engaged in and switching that synchronous communication from a packet-switched connection to a circuit-switched connection based on the determined quality.
Figure 5:
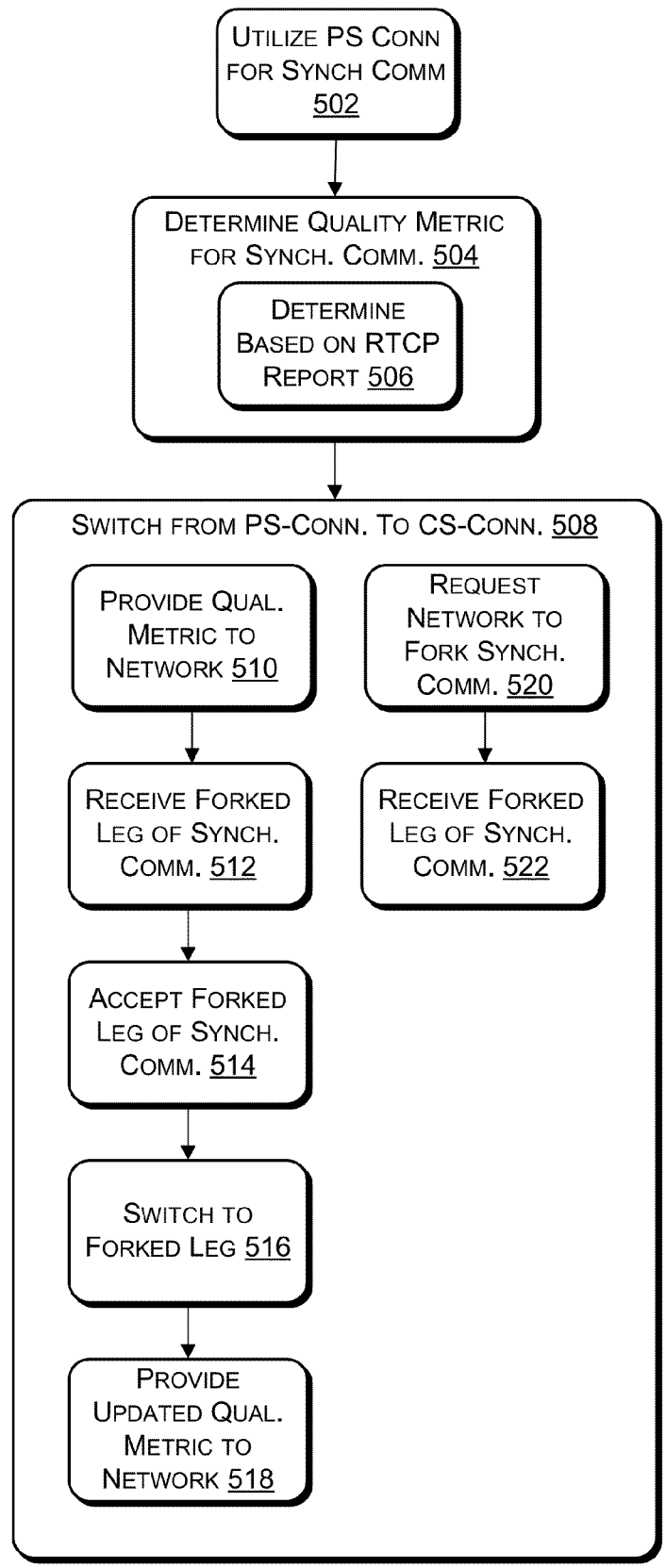
FIG. 5 illustrates an example process performed by a telecommunication device for determining a quality of a synchronous communication that the telecommunication device is engaged in and participating in switching that synchronous communication from a packet-switched connection to a circuit-switched connection based on the determined quality.

FIGS. 4 and 5 illustrate example processes 400 and 500. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process performed by devices of a telecommunication network for receiving or determining a quality of a synchronous communication that a telecommunication device is engaged in and switching that synchronous communication from a packet-switched connection to a circuit-switched connection based on the determined quality. The process 400 includes, at 402, utilizing a packet-switched connection between a telecommunication device and a telecommunication network for a synchronous communication. The synchronous communication may be one of a voice call, a video chat, a video conference, or an instant messaging session. The telecommunication network may include an HSPA+ network and the packet-switched connection and circuit-switched connection may respectively be associated with a packet-switched bearer and circuit-switched bearer of the HSPA+ network. Alternatively, the packet-switched connection may be associated with one of an LTE network or Wi-Fi network, the LTE network or Wi-Fi network being in communication with or part of the telecommunication network.

At 404, one or more devices of the telecommunication network may receive a quality metric associated with the synchronous communication, the quality metric describing a quality of the synchronous communication. In some embodiments, the one or more devices may implement a telephony application server (TAS) or a mobile switching center (MSC) of the telecommunication network. At 406, the receiving may include receiving the quality metric from a telecommunication device. At 408, the receiving may also or instead include receiving the quality metric from one or more other devices of a telecommunication network, such as a session border controller (SBC) or a media gateway of the telecommunication network. In some embodiments, the telecommunication device determines the quality of the synchronous communication from a downlink channel of the packet-switched connection and the other device of the telecommunication network determines the quality of the synchronous communication from an uplink channel of the packet-switched connection. The quality metric may be received as a presence update from a presence server of the telecommunication network. The presence server may, in turn, receive the presence update from a presence client of the telecommunication device or a presence client of the telecommunication network (e.g., from a presence client implemented on an SBC or media gateway). The presence clients may determine the quality using RTCP.

At 410, the one or more devices of the telecommunication network, such as the TAS or MSC, may switch the synchronous communication from the packet-switched connection to a circuit-switched connection associated with the telecommunication network based at least in part on the quality metric. At 412, the switching may include forking the synchronous communication and, at 414, initiating a communication to the telecommunication device over the circuit-switched connection, the initiated communication being a forked leg of the synchronous communication. At 416, the switching may further include receiving an updated quality metric indicating that the packet-switched connection is no longer in use and, at 418, in response, deallocating network resources associated with the packet-switched connection.

In some embodiments, the one or more devices of the telecommunication network perform the operations shown at blocks 402-418 for a plurality of telecommunication devices in a prioritized manner based on codecs associated with the synchronous communications of the plurality of telecommunication devices.

FIG. 5 illustrates an example process performed by a telecommunication device for determining a quality of a synchronous communication that the telecommunication device is engaged in and participating in switching that synchronous communication from a packet-switched connection to a circuit-switched connection based on the determined quality. The process 500 includes, at 502, utilizing, by a telecommunication device, a packet-switched connection between the telecommunication device and a telecommunication network for a synchronous communication.

At 504, the telecommunication device determines a quality metric for the synchronous communication based at least in part on monitoring of the synchronous communication, the synchronous communication being transmitted using a packet-switched connection associated with a telecommunication network. At 506, the determining includes analyzing an RTCP report from an RTCP application of the telecommunication device, the RTCP report including a number of metrics describing a quality of the synchronous communication as perceived by the telecommunication device. The metric describing the quality of the synchronous communication may be indicative of packet loss, packet discard, network delay, end system delay, or signal level.

At 508, the telecommunication device may switch the synchronous communication from the packet-switched connection to a circuit-switched connection over the telecommunication network based at least in part on the quality metric. The switching may include performing a first technique at blocks 510-518 or a second technique at blocks 520-522. With the first technique, at block 510, the telecommunication device may provide the quality metric to the telecommunication network and, at 512, receive, in response, an incoming communication forked from the synchronous communication. At 514, the telecommunication device may then accept the incoming communication, and, at 516, may switch the synchronous communication to the incoming communication. At 518, the telecommunication device may then provide an updated quality metric in another presence update message to the presence server, the other presence update message indicating that the packet-switched connection is no longer in use. With the second technique, at block 520, the telecommunication device may request that the telecommunication network fork the synchronous communication to use the circuit-switched connection and, in response, at 522, may receive from the telecommunication network an incoming, forked communication over the circuit-switched connection.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. One or more devices of a telecommunication network, comprising:

a first device to determine a quality metric and to provide the quality metric in a presence update message, wherein the first device is one of a session border controller (SBC) or a media gateway;

a presence server to receive the quality metric in the presence update message and to post the quality metric to subscribed devices of the telecommunication network; and a second device to receive the posted quality metric and, based at least in part on the posted quality metric, to fork voice call over a circuit-switched connection associated with the telecommunication network to cause a telecommunication device to use the circuit-switched connection in place of a packet-switched connection, wherein the second device is one of a telephony application server (TAS) or a mobile switching center (MSC).

2. The one or more devices of claim 1, wherein the quality metric is a first quality metric and the presence server receives a second quality metric from the telecommunication device and posts the first quality metric, the second quality metric, or a synthesis of the first quality metric and the second quality metric.

3. The one or more devices of claim 1, wherein the quality metric is determined using a real-time transport control protocol (RTCP).

4. One or more non-transitory computer-readable media storing computer-executable instructions that are programmed to configure a telephony application server (TAS) or a mobile switching center (MSC) of a telecommunication network to perform operations comprising:

receiving, from a presence server, a quality metric associated with a synchronous communication over a packet-switched connection between a telecommunication device and the telecommunication network, the quality metric describing a quality of the synchronous communication, wherein the quality metric was received by the presence server from a session border controller (SBC) or a media gateway or is a synthesis generated by the presence server;

receiving from the telecommunication device a request to fork the synchronous communication to use a circuit-switched connection associated with the telecommunication network; and based at least in part on the quality metric and the request, switching the synchronous communication from the packet-switched connection to the circuit-switched connection.

5. The one or more non-transitory computer-readable media of claim 4, wherein the synchronous communication is one of a voice call, a video chat, a video conference, or an instant messaging session.

6. The one or more non-transitory computer-readable media of claim 4, wherein the telecommunication network includes an HSPA+ network and the packet-switched connection and circuit-switched connection are respectively associated with a packet-switched bearer and circuit-switched bearer of the HSPA+ network.

7. The one or more non-transitory computer-readable media of claim 4, wherein the packet-switched connection is associated with one of an LTE network or Wi-Fi network, the LTE network or Wi-Fi network being in communication with or part of the telecommunication network.

8. The one or more non-transitory computer-readable media of claim 4, wherein the receiving the quality metric comprises receiving the quality metric as a presence update.

9. The one or more non-transitory computer-readable media of claim 4, wherein the telecommunication device determines the quality of the synchronous communication from a downlink channel of the packet-switched connection and the SBC or media gateway determines the quality of the synchronous communication from an uplink channel of the packet-switched connection.

10. The one or more non-transitory computer-readable media of claim 4, wherein the quality is determined using RTCP.

11. The one or more non-transitory computer-readable media of claim 4, wherein the switching comprises forking the synchronous communication and initiating a communication to the telecommunication device over the circuit-switched connection, the initiated communication being a forked leg of the synchronous communication.

12. The one or more non-transitory computer-readable media of claim 4, wherein the switching further comprises receiving an updated quality metric indicating that the packet-switched connection is no longer in use and, in response, deallocating network resources associated with the packet-switched connection.

13. The one or more non-transitory computer-readable media of claim 4, wherein the TAS or MSC perform the utilizing, receiving the quality metric, receiving the request, and switching for a plurality of telecommunication devices in a prioritized manner based on codecs associated with the synchronous communications of the plurality of telecommunication devices.

14. A method comprising:

receiving, by one of a telephony application server (TAS) or a mobile switching center (MSC), from a presence server, a quality metric associated with a synchronous communication over a packet-switched connection between a telecommunication device and a telecommunication network, the quality metric describing a quality of the synchronous communication, wherein the quality metric was received by the presence server from a session border controller (SBC) or a media gateway or is a synthesis generated by the presence server;

receiving, by the one of the TAS or the MSC, from the telecommunication device a request to fork the synchronous communication to use a circuit-switched connection associated with the telecommunication network; and based at least in part on the quality metric and the request, switching, by the one of the TAS or the MSC, the synchronous communication from the packet-switched connection to the circuit-switched connection.

15. The method of claim 14, wherein the synchronous communication is one of a voice call, a video chat, a video conference, or an instant messaging session.

16. The method of claim 14, wherein the telecommunication network includes an HSPA+ network and the packet-switched connection and circuit-switched connection are respectively associated with a packet-switched bearer and circuit-switched bearer of the HSPA+ network.

17. The method of claim 14, wherein the packet-switched connection is associated with one of an LTE network or Wi-Fi network, the LTE network or Wi-Fi network being in communication with or part of the telecommunication network.

18. The method of claim 14, wherein the receiving the quality metric comprises receiving the quality metric as a presence update.

19. The method of claim 14, wherein the telecommunication device determines the quality of the synchronous communication from a downlink channel of the packet-switched connection and the SBC or media gateway determines the quality of the synchronous communication from an uplink channel of the packet-switched connection.

20. The method of claim 14, wherein the quality is determined using RTCP.

21. The method of claim 14, wherein the switching comprises forking the synchronous communication and initiating a communication to the telecommunication device over the circuit-switched connection, the initiated communication being a forked leg of the synchronous communication.

22. The method of claim 14, wherein the switching further comprises receiving an updated quality metric indicating that the packet-switched connection is no longer in use and, in response, deallocating network resources associated with the packet-switched connection.

23. The method of claim 14, wherein the one of the TAS or the MSC performs the utilizing, receiving the quality metric, receiving the request, and switching for a plurality of telecommunication devices in a prioritized manner based on codecs associated with the synchronous communications of the plurality of telecommunication devices.

* * * * *